United States Patent [19]
Li et al.

[11] Patent Number: 5,794,231
[45] Date of Patent: Aug. 11, 1998

[54] METHOD FOR APPLICATION-PROGRAM DATABASE INTERFACE

[75] Inventors: Margaret H. Li, Bellevue, Wash.; Serge Joseph Limoges, Etobicoke, Canada

[73] Assignee: International Business Machines Corporation, Armonk, N.Y.

[21] Appl. No.: 727,719

[22] Filed: Oct. 7, 1996

[30] Foreign Application Priority Data

Dec. 28, 1995 [CA] Canada ................................. 2166257

[51] Int. Cl.⁶ .................................................. G06F 17/30
[52] U.S. Cl. ................................. 707/2; 707/4; 707/102
[58] Field of Search .................................. 707/2, 4, 102

[56] References Cited

U.S. PATENT DOCUMENTS 5,611,076  3/1997  Durflinger et al. ............... 707/102
5,664,173  9/1997  Fast ..................................... 707/4
5,689,698  11/1997  Jones et al. ........................ 1/1

OTHER PUBLICATIONS

Cohen, Dave, "Realizing the Potential of SQL: Understanding the Nature of embedded SQL is Necessary to Exploit it Fully", Computer Language, vol. 9, No. 3, Mar., 1992, pp. 53–60.

*Primary Examiner*—Paul R. Lintz
*Attorney, Agent, or Firm*—Baker Maxham Jester & Meador

[57] ABSTRACT

The method provides for treating an embedded static SQL program that resides with the CLI application (rather than at the database manager) in an analogous manner to stored procedures. When the CLI application sends a SQL CALL statement syntactically identical to a stored procedure call, the CLI implementation can intercept the call and, instead of invoking the stored procedure, invoke the embedded static program.

4 Claims, 1 Drawing Sheet

METHOD FOR APPLICATION-PROGRAM DATABASE INTERFACE

BACKGROUND OF THE INVENTION

1. Field of the Invention

The present invention relates to database interface programs in general, and to Call Level Interface (CLI) programs in particular. More particularly still, it relates to a method permitting use of static instead of only dynamic Structured Query Language (SQL) statements with CLI, while maintaining the interactive appearance of CLI to the user; yet providing encapsulation of data in the database for improved secrecy and the like reasons.

2. Description of the Related Art

In a relational DataBase Management System (DBMS) using the Structured Query Language (SQL), commands are generally implemented using either dynamic SQL, or embedded static SQL. With dynamic SQL, commands are compiled and executed interactively. With embedded static SQL, the DBMS precompiles SQL statements into access plans (preprocessed, pre-optimized, executable programs) which the DBMS can then execute at a later time.

Applications using embedded static SQL programs often provide performance advantages over applications using dynamic SQL because the cost for generating the access plan is not incurred during execution (since these costs have already been incurred during the pre-processing stage). Furthermore, these access plans can be reused many times, while the compiling costs are only incurred once.

Encapsulation of data is an additional benefit obtain by using static SQL. In many applications, any particular user may legitimately require certain data from a table, but will not need (nor should they be permitted) access to other fields of a table. In order for a user to query data in a table using dynamic SQL, that user must be granted access to the entire table. With embedded static SQL, a user does not need access to the table, but is rather granted the EXECUTE privilege to an embedded static SQL access plan ("package"). This access plan will only return data from predefined fields, thus preventing the user from accessing other fields.

A Call Level Interface (CLI) is a program (which normally forms part of a DBMS) which acts as an interface between a database engine and an application program which requests access to a database. In order to provide a natural programming interface, CLIs must act interactively. In order to act interactively, CLIs must access data using dynamic SQL. Thus a disadvantage of using CLIs as an application interface to a relational database is their inability to take advantage of the performance and data encapsulation benefits of Static SQL.

Traditionally, with embedded static SQL programs, database administrators need only to grant users EXECUTE privilege on the packages (access plans) associated with the static SQL programs. Today, many off-the-shelf database applications are written instead to the Call Level Interface via dynamic SQL because CLI is viewed as a more natural programming interface, much preferred by database application vendors. With dynamic SQL (where privilege checking is performed at execution time), users must be granted explicit access to the database tables; thus users now have access to all the data in the table rather than just the portion that they have a 'need-to-know'. This is highly undesirable in organizations where encapsulation of data is important.

This problem would normally be solved by having the Call Level Interface application invoke a stored procedure residing at the database server. This stored procedure would be written in embedded static SQL. However, for those products that do not allow stored procedures to contain queries that return one or more SQL result sets with an unlimited number of rows, the stored procedure approach cannot be used.

U.S. Pat. No. 5,257,366, granted Oct. 26, 1993 to Adair et al. and titled "Query Language Execution on Heterogeneous Database Servers Using a Bind-File Bridge Between Application and Database Languages" is a useful background patent for understanding the present invention and is incorporated herein by reference.

SUMMARY OF THE INVENTION

This invention provides a method where CLI applications can be written to take advantage of the encapsulation and good performance properties of the embedded static SQL programs. In addition, it provides a method for the CLI application to use existing mechanisms already available in the Call Level Interface to retrieve multiple result sets with unlimited number of rows. Furthermore, this method provides seamless application portability to access future persistent stored module technology (including the ability of the stored procedure to return multiple rows and multiple result sets).

The method provides for treating an embedded static SQL program that resides with the CLI application (rather than at the database manager) in an analogous manner to stored procedures. When the CLI application sends a SQL CALL statement syntactically identical to a stored procedure call, the CLI implementation can intercept the call and, instead of invoking the stored procedure, invoke the embedded static program. Because this static SQL program has associated package(s) at the database manager, database administrators would again only need to grant users EXECUTE privilege on these packages to appropriately restrict access to various portions of data. Because the static SQL in this program has been preprocessed, it is possible that some performance benefits can be realized as well.

In order to allow the CLI application to retrieve potentially unlimited number of rows associated with an arbitrary number of result sets generated from queries in the embedded SQL program, the embedded SQL routines must be written in a special manner, and named in a specified way. The naming allows CLI to distinguish between invocations to real stored procedures at the database manager versus embedded SQL routines that are part of the application.

Thus the improved method for call level interface with a database comprises the steps of:

(a) defining a first keyword list of CLI embedded routine names;

(b) defining a second keyword list of locations of said embedded routine names;

(c) intercepting a CLI statement before delivery to the database upon detection of said first keyword;

(d) loading embedded routines named in said first keyword from matching locations listed in said second keyword; and (e) executing said embedded routines by accessing said database.

BRIEF DESCRIPTION OF THE DRAWINGS

The preferred embodiments of the present invention will now be described in detail in conjunction with the drawings, in which:

The drawing FIGURE is a flow-chart showing the method of call level interface application for DB2 type databases according to the present invention.

DETAILED DESCRIPTION OF THE PREFERRED EMBODIMENTS

Figure 1:
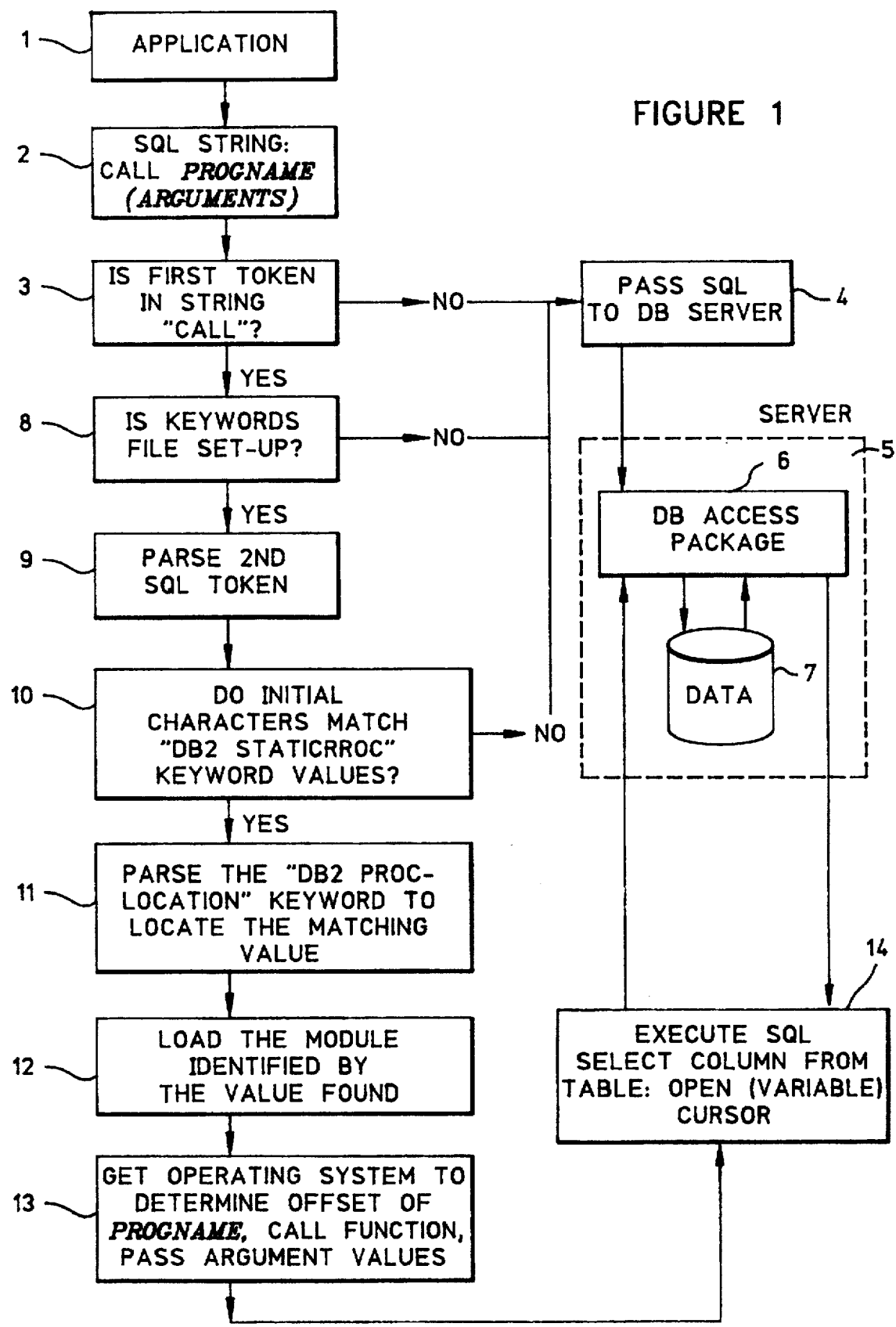

The CLI invocation mechanism for these embedded static routines is purposely identical to the CALL statement used to invoke a stored procedure at the database server. The CLI implementation is informed, via external mechanisms such as environment variables or configuration settings, when to intercept a CALL statement and invoke an embedded SQL routine. The method used in DB2 CLI is to define two keywords in the CLI initialization file:

DB2STATICPROC—this is a list of initials of routine names. All program names in the CALL statement that start with any of these initials will cause CLI to divert the CALL statement.

DB2PROCLOCATION—this is the location of the dynamic load libraries or shared libraries that contain the embedded static SQL routines.

For example, given that:
DB2STATICPROC="xx,yy"
DB2PROCLOCATION="xx=x:\sqllib\bin\myproc.dll, yy=w:\dll\hisproc.dll"; then all program names on the CALL statement that start with either 'xx' or 'yy' will be diverted. The CLI implementation will load the dynamic load libraries (e.g. 'x''\sqllib\bin\myproc.dll'.) containing these routines. The location list keyword DB2PROCLOCATION can be the full path name of the dynamic load library (or shared library) or just the name of the library itself. In the letter case, CLI will attempt to load the dynamic load library (or shared library) from the currently defined library path.

This externally defined identification scheme allows users to place such embedded static routines on a central file server to facilitate easier maintenance. Should the database manager be upgraded to support stored procedures that permit retrieval of unlimited rows and multiple result sets, users can simply remove the DB2STATICPROC and DB2PROCLOCATION keywords and provide the appropriate stored procedure at the site of the database manager. In such event, the CLI application itself need not change at all; so that application portability and upward capability are achieved. This is especially valuable in cases where the CLI application is "off-the-shelf" software.

Referring now to the drawing FIGURE, the flow-chart for call level interface for a DB2 database is shown. An application program 1 is examined to see if its SQL strings 2 begin with "CALL" 3, and if it does not the SQL string is passed 4 onto the server 5 and processed normally by its DB Access Package 6, which interfaces the database 7. If the SQL string begins with "CALL" and a "keywords file" has been set-up 8, then the second token in the SQL string is passed 9, otherwise the SQL string is passed onto the DB access package 6. Once passed, however, the critical characters in the second token are examined 10 to find a match with DB2 static procedure keyword values; if there is no match the, again, the SQL string is simply passed onto the DB access package 6. If a match is found at step 10, however, then the keyword is parsed 11 and the matching static procedure value (address) is located, and the module at that value is loaded 12. The operating system thereafter proceeds in the normal manner to implement the application program (PROGNAME) and execute the SQL string via the DB access package 6 of the server 5.

An example of the CLI application code for retrieval if use related data from, say, an employee database, would be as follows:

```
SQLHSTMT              hstmt;
SQLSMALLINT           age1, age2, columns;
SQLRETURN             rc = SQL_SUCCESS;
:
:
age1 = 25;
age2 = 35;
:
/* Set up the parameters to be passed to the embedded static
SQL routine */
rc = SQLBindParameter (hstmt, 1, SQL_PARAM_INPUT,
SQL_C_SMALLINT, SQL_SHORT, 0, 0, &age1, NULL);
rc = SQLBindParameter (hstmt, 2, SQL_PARAM_INPUT,
SQL_C_SMALLINT, SQL_SHORT, 0, 0, &age2, NULL);
/* Call the embedded routine, CLI will route */
rc = SQLExecdirect (hstmt, "CALL xyAgeRanges(?, ?)",
SQL_NTS);
/* Describe all the columns if nature of result set is not known */
/* Next use SQLBindCol() if desired */
rc = SQLFetch (hstmt);
:
:
rc = SQLFreeStmt (hstmt, SQL_CLOSE);
```

The necessary settings in the CLI initialization file would be:

```
DB2STATICPROC= "xy" DB2PROCLOCATION=
"X:\ROUTINES\DLL\STATSQL.DLL"
```

The corresponding embedded static SQL code clip would be:

```
void xyAgeRanges (struct sqlchar   *input_data,
                  struct sqlda     *input_SQLDA,
                  struct sqlda     *inout_SQLDA,
                  struct sqlca     *ca)
{
/* Declare the host variables */
EXEC SQL BEGIN DECLARE SECTION;
    short int                ageLowerLimit;
    short int                ageUpperLimit;
    EXEC SQL END DECLARE SECTION;
    /* Copy the information from the inout_SQLDA
    into the host variables */
    :
    :
    /* Actual static SQL query statement */
    EXEC SQL DECLARE AGE_CUR CURSOR FOR
    SELECT EMPNO, LASTNAME, FIRSTNAME, AGE
    FROM EMPLOYEE
    WHERE AGE <:ageUpperLimit AND AGE>
    :ageLowerLimit
    ORDER BY 1;
    /* Open the cursor so that the CLI application can
    fetch data */
    EXEC SQL OPEN AGE_CUR;
    /* Tell CLI static routine should stay loaded;
    * alternatively, if this is not desirable SQLZ_
    DISCONNECT_PROC
    * should be used,
    */
    return (SQLZ_HOLD_PROC);
}
```

In the above example, the EMPLOYEE table may contain a column called SALARY which the user will not see because the query does not return that column. Without this solution, the database administration would have to give the user access to the entire table, or create a view (which is not updatable).

As previously mentioned, in order to use the capability of retrieving multiple rows from results sets arising from queries in the embedded static SQL routine, the static SQL routine must be written in a particular style. The following contains the C function prototype of the embedded static routine that the CLI implementation will be calling:

```
int progname (struct sqlchar *input_data,
              struct sqlda   *input_SQLDA,
              struct sqlda   *inout_SQLDA,\
              struct sqlca   *ca);
```

This interface is identical to the DB2 Database Application Remote Interface (DARI) definition. The CLI implementation will always provide NULL values for the input_data and input_SQLDA pointers. The format of 'progname' has already been discussed; it must contain the initials in the list defined in the DB2STATICPROC initialization keyword. The function return value must be one of two values:

SQLZ_HOLD_PROC: keep the routine loaded in memory after it has finished executing; or SQLZ_DISCONNECT_PROC: unload the routine after execution The routine would consist of the following steps:
1. Declaration of host variables;
2. Code which copies the information from he SQLDA structure (pointed to by inout_SQLDA) to the host variables;
3. Actual static SQL statements using the host variables as parameters, such as a parameterized static query;
4. For each query result set that the CLI application needs to retrieve, open the cursor; and
5. Return to the caller.

The key in this approach is step 4, where the cursor(s) are left open. The cursor for each result set must be opened and must stay open when the embedded static SQL routine returns to the caller (the CLI implementation). There must not be any CONNECT, RELEASE, or COMMIT in the body of this static SQL routine; otherwise, errors or unpredictable behaviour may occur.

When the embedded static routine has opened all the required cursors and returned, the CLI implementation remembers that this CALL statement has been associated with an embedded static routine. Next, the CLI implementation returns program control to the application and indicates the completion of the SQL CALL statement processing. The application can now initiate the retrieval of rows via the CLI fetch functions. If multiple cursors have been opened, then the result sets will be returned to the application in the order that the associated cursors were opened in the embedded static SQL routine.

The method of the invention may be implemented in program code on a suitable program product such as disk or tape.

The embodiments of the invention in which an exclusive property or privilege is claimed are defined as follows:

1. An improved method for database access by a call level interface (CLI) program, comprising:

(a) defining a first keyword list of CLI embedded routine names;

(b) defining a second keyword list of locations of said embedded routine names;

(c) intercepting a CLI statement before delivery to the database upon detection of said first keyword;

(d) loading embedded routines named in said first keyword from matching locations listed in said second keyword; and (e) executing said embedded routines by accessing said database.

2. The method as claimed in claim 1, wherein said database is DB2 type database.

3. The method as claimed in claim 2, step (e) further comprising selecting a data field and opening a corresponding cursor, then returning control to said CLI program.

4. A computer program product comprising a computer usable medium having computer readable program code means therein for implementing an improved method for database access by a call level interface (CLI) program, comprising:

(a) computer readable program code means for causing a computer to define a first keyword list of CLI embedded routine names;

(b) computer readable program code means for causing a computer to define second keyword list of locations of said embedded routine names;

(c) computer readable program code means for causing a computer to intercept CLI statement before delivery to the database upon detection of said first keyword;

(d) computer readable program code means for causing a computer to load embedded routines named in said first keyword from matching locations listed in said second keyword; and (e) computer readable program code means for causing a computer to execute said embedded routines by accessing said database.

* * * * *